Jan. 9, 1940.   G. E. M. PERROUX   2,186,554
ALTITUDE GUIDING SYSTEM FOR AIRPLANES
Filed May 27, 1938
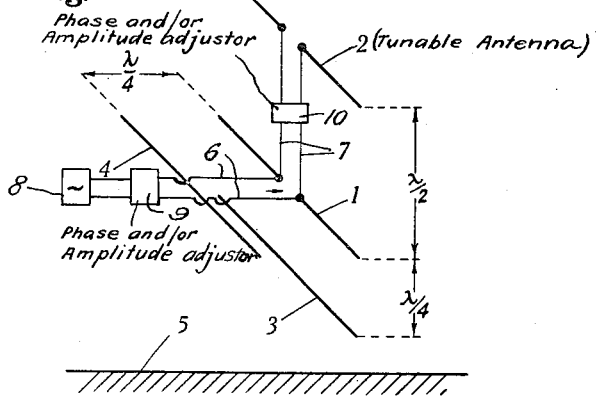
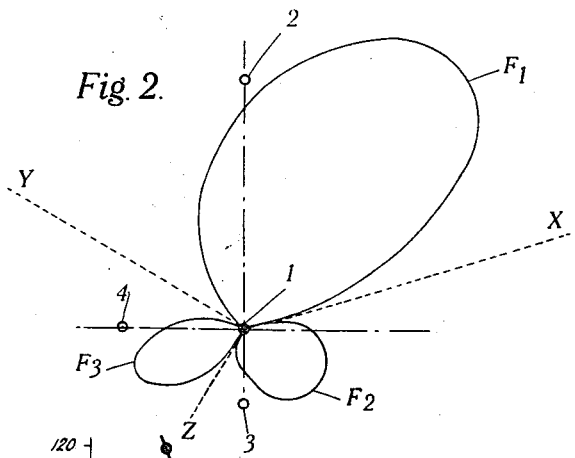
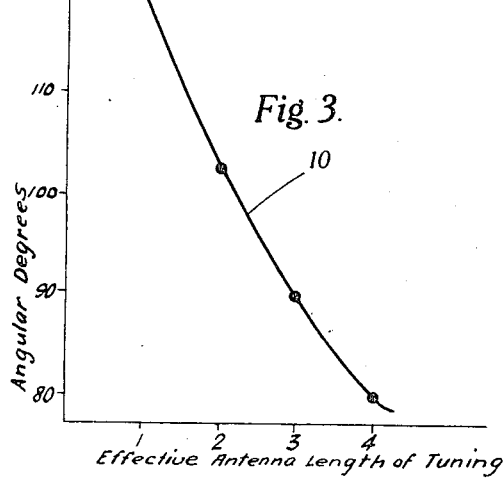
INVENTOR
G. E. M. PERROUX
BY
ATTORNEY Patented Jan. 9, 1940

2,186,554

UNITED STATES PATENT OFFICE 2,186,554

ALTITUDE GUIDING SYSTEM FOR AIRPLANES

Georges Edme Marcel Perroux, Paris, France, assignor to International Standard Electric Corporation, New York, N. Y.

Application May 27, 1938, Serial No. 210,346
In France June 11, 1937

9 Claims. (Cl. 250—11)

The present invention relates to directive antenna systems employing radio electric waves for guiding vehicles, particularly for altitude guiding of aircraft.

Objects of the invention are:—
(1) To provide aerial systems particularly arranged for altitude guiding of airplanes.
(2) To provide arrangements for obtaining vertical guiding diagrams which have a constant slope.
(3) To provide arrangements for varying the slope of a vertical guiding diagram as desired.
(4) To provide arrangements for obtaining particularly narrow vertical guiding diagrams.
(5) To provide altitude guiding systems of increased sensitivity.

A directive antenna system for altitude guiding of aircraft according to the present invention is characterised in that it comprises two antenna elements arranged one above the other in a vertical plane and at a distance apart equal to one-half a working wave-length and a reflector in the plane containing the two antenna elements and at a distance from the lower one equal to one-quarter of a working wave-length, and a second reflector in the horizontal plane containing the lower antenna element and at a distance from the lower antenna element equal to one-quarter of the working wave-length. A suitable type of antenna element is the dipole antenna and in this case the two elements may be electrically connected to each other and to a common source of exciting current. The width of the principal lobe of the radiation diagram may be adjusted by varying the phase of the current in one of the reflectors and the direction of the axis of no radiation may be adjusted by adjusting the phase or the amplitude or both the phase and the amplitude of the current in one of the antenna elements.

The invention will be explained in detail in the following description of an embodiment of the invention taken in conjunction with the accompanying drawing, in which:

Fig. 1 represents an example of an altitude aerial system incorporating features of the invention.

Fig. 2 represents the section through a vertical plane of the radiation diagram produced by the aerial system of Fig. 1, and Fig. 3 shows a curve employed in the explanation of the invention giving, by way of example, the variation of a characteristic of the diagram of Fig. 2.

Referring to Fig. 1, the elements of the aerial system are represented in the horizontal arrangement suitable for vertical or altitude guiding without the production of any very important harmful effects by reflection of the emitted waves from the ground. In fact, the coefficients of reflection from the main ground are small for the angles of incidence to be considered in the particular application of altitude guiding under consideration. The reflected waves are consequently of low amplitude and cause no serious disturbances of the field of direct radiation. Moreover, the phase of the reflected radiation varies little but in a progressive manner as a function of the angle of incidence, within the limits of the angle of incidence under consideration. The field curves produced by the direct radiation are, consequently, little affected by the reflected radiation.

The two antennae 1 and 2 in Fig. 1 are arranged one under the other and at a distance equal to one-half the working wavelength. The reflector 3 is located below the antenna 1 in the vertical plane containing the antenna 1 and 2 and at a distance from the antenna 1 equal to one-quarter of the wavelength on which the antenna 1 operates. The reflector 4 is located in the horizontal plane containing the antenna 1 and at a distance therefrom equal to one-quarter of the working wavelength. This unit is located at a certain distance above the ground 5. The antennae 1 and 2 are supplied by a common source of high frequency energy 8 connected at 6 through any well-known form of phase and/or amplitude adjuster 9, and are electrically connected by a transmission line 7. A similar phase and/or amplitude adjuster 10, may be provided in the line 7. The antennae supports have been omitted from the drawing for the sake of simplicity.

Such a system of antenna elements which is a non-limiting example of a suitable arrangement for the putting into practice of the present invention gives a radiation diagram such as that shown in Fig. 2 which is a section through a vertical plane of the characteristic of the antenna system.

In this drawing, 1 represents the section of the antenna 1, 2 the section of the antenna 2, 3 and 4 sections of the reflectors in the plane of the figure. The three dotted axes 1—X, 1—Y and 1—Z designate directions of zero radiation which are tangential to the three lobes F1, F2 and F3 of the characteristic. The principal lobe F1 is far more important than the two minor lobes F2, F3 of parasitic radiation.

The angular position of the directions of zero field may be modified without mechanically displacing any element of the antenna system by varying the phase or the amplitude, or both the phase and the amplitude of the current passing through one or more of the antenna elements. It is, for example, possible to vary the intensity of the current circulating in the antenna 2 by modifying its tuning. Thus as is well-known in the art the antenna 2 may be tuned by varying its effective length electrically or mechanically and any well-known means such as a resistance may be provided in the antenna circuit to control the amplitude of radiation.

When the inclination of the zero field direction 1—X is modified or varied as desired with respect to the horizontal, it is possible to control the mean slope of the lower portion of the principal lobe F1 which is usually employed in altitude guiding. In particular, the adjustment of the elements of the antenna system may be such that the zero field direction 1—X is parallel to ground. Under these conditions the energy radiated to ground is very weak and gives practically negligible reflection effects.

Fig. 3 gives by way of example a curve 10 representing the variation of the angle 21X as a function of the tuning of the antenna 2. The ordinates are plotted in degrees and the abscissae are arbitrarily chosen units.

If, moreover, the angle 21Y is varied, that is to say, the direction 1—Y, for example by varying the phase of the reflector 4, the angle Y1X between the two directions of zero radiation 1—Y and 1—X is consequently modified. This angle determines the width of the principal lobe F1 and it is advantageous to reduce this width for the following reasons: in the vicinity of the axis 1—X, within the part of the lobe F1 which is employed for guiding airplanes, the field lines become closer together as the angle Y1X decreases, that is to say, the sensitivity of the system from the radio guiding point of view is increased, other things remaining the same. Moreover, the field lines in the vicinity of the axis 1—X are very slightly curved and within practical limits may be looked upon as rectilinear, all the more so the narrower the diagram. The landing paths to be followed by an airplane may thus be given a substantially constant slope.

As already mentioned, the inclination of the direction of zero field 1—X can be varied as desided, the constant slope of the landing paths can thus be adjusted within wide limits. This adjustment may render it necessary for the direction 1—X to be inclined to the ground instead of being horizontal. In this case reflections are produced because the energy radiated to ground is no longer negligible. Experience has shown that by suitably choosing the plane of the polarization of the waves the landing paths may be made substantially independent of these reflections.

It is clear that the invention is not limited to the arrangement of aerial elements shown and described, but can on the contrary be employed in numerous cases arising in the art of altitude guiding of airplanes, particularly for blind landing.

What is claimed is:

1. A directive antenna system comprising two antenna elements arranged one above the other in a vertical plane and at a distance apart equal to one-half a working wavelength, a reflector in the plane containing the two antenna elements and at a distance from the lower one equal to one-quarter of a working wavelength, and a second reflector in the horizontal plane containing the lower antenna element and at a distance from the lower antenna element equal to one-quarter of the working wavelength.

2. A directive antenna system comprising two antenna elements arranged one above the other in a vertical plate and at a distance apart equal to one-half a working wavelength, a reflector in the plane containing the two antenna elements and at a distance from the lower one equal to one-quarter of a working wavelength, and a second reflector in the horizontal plane containing the lower antenna element and at a distance from the lower antenna element equal to one-quarter of the working wavelength, and a source of exciting current common to the antenna elements.

3. A directive antenna system according to claim 2 having means for varying the phase of the current flowing in one antenna element so as to adjust the direction of the axis of no radiation.

4. A directive antenna system according to claim 2 having means for varying the amplitude of the current flowing in one antenna element so as to adjust the direction of the axis of no radiation.

5. A directive antenna system according to claim 2 having means for varying the phase and amplitude of the current flowing in one antenna element so as to adjust the direction of the axis of no radiation.

6. A directive antenna system according to claim 2 having means for varying the phase of the currents flowing in one of the reflectors so as to adjust the width of the principal lobe of the characteristic diagram of the antenna system.

7. A directive antenna system for altitude guiding of aircraft which comprises two dipole antenna elements arranged one above the other in a vertical plane and at a distance apart equal to one-half a working wavelength, a reflector in the plane containing the two dipole elements and at a distance from the lower element equal to one-quarter of a working wavelength, and a second reflector in the horizontal plane containing the lower dipole element and at a distance from the lower dipole element equal to one-quarter of a working wavelength, a source of exciting current common to the two dipole elements, means for varying the phase of the current in one of the reflectors and means for varying the phase of the current in one dipole element.

8. A directive antenna system for altitude guiding of aircraft which comprises two dipole antenna elements arranged one above the other in a vertical plane and at a distance apart equal to one-half a working wavelength, a reflector in the plane containing the two dipole elements and at a distance from the lower element equal to one-quarter of a working wavelength, and a second reflector in the horizontal plane containing the lower dipole element and at a distance from the lower dipole element equal to one-quarter of a working wavelength, a source of exciting current common to the two dipole elements, means for varying the phase of the current in one of the reflectors and means for varying the amplitude of the current in one dipole element.

9. A directive antenna system for altitude guiding of aircraft which comprises two dipole antenna elements arranged one above the other in a vertical plane and at a distance apart equal to one-half a working wavelength, a reflector in the plane containing the two dipole elements and at a distance from the lower element equal to one-quarter of a working wavelength, and a second reflector in the horizontal plane containing the lower dipole element and at a distance from the lower dipole element equal to one-quarter of a working wavelength, a source of exciting current common to the two dipole elements, means for varying the phase of the current in one of the reflectors and means for varying the amplitude and phase of the current in one dipole element.

GEORGES EDME MARCEL PERROUX.